United States Patent [19]
Feuillade et al.

[11] 3,989,540
[45] Nov. 2, 1976

[54] METHOD FOR PREPARING ELECTROCHEMICAL ELEMENTS IN THIN LAYERS

[75] Inventors: Georges Feuillade, Arpajon; Bernard Chenaux, Paris; Philippe Perche, Bures-sur-Yvette, all of France

[73] Assignee: Compagnie Generale d'Electricite, Paris, France

[22] Filed: May 2, 1974

[21] Appl. No.: 466,339

[30] Foreign Application Priority Data
May 18, 1973  France .............................. 73.18171
Sept. 21, 1973  France ............................ 73.33972

[52] U.S. Cl. .............................. 29/623.1; 136/158; 136/176; 29/623.2; 29/623.5
[51] Int. Cl.² ....................................... H01M 35/18
[58] Field of Search ........................... 136/157–158, 136/108, 176, 6 R, 111, 109, 20, 23, 100 R

[56] References Cited
UNITED STATES PATENTS

| | | |
|---|---|---|
| 2,723,301 | 11/1955 | West, Jr. et al. .................. 136/157 X |
| 2,747,009 | 5/1956 | Kirkwood et al. ............... 136/157 X |
| 2,762,858 | 9/1956 | Wood .............................. 136/157 X |
| 2,903,498 | 9/1959 | Sindel et al. ......................... 136/108 |
| 3,018,316 | 1/1962 | Higgins et al. ................... 136/157 X |

*Primary Examiner*—Anthony Skapars
*Attorney, Agent, or Firm*—Sughrue, Rothwell, Mion, Zinn and Macpeak

[57] ABSTRACT

Electrochemical elements in thin layers comprising a stack of thin layers, successively a copper layer, a catholyte, a separator, a lithium layer, the catholyte and the separator being formed by a gel comprising more particularly formal or polyvinylic butyral, reticulated or otherwise and impregnated with a solvent such as propylene carbonate or N-methyl-pyrrolidone saturated with an ionically conductive salt such as ammonium perchlorate. A variant consists in forming the separator with a gel of reticulated polymer basically containing polyvinylidene fluoride and a mineral charge such as magnesia.

15 Claims, 1 Drawing Figure

U.S. Patent    Nov. 2, 1976    3,989,540
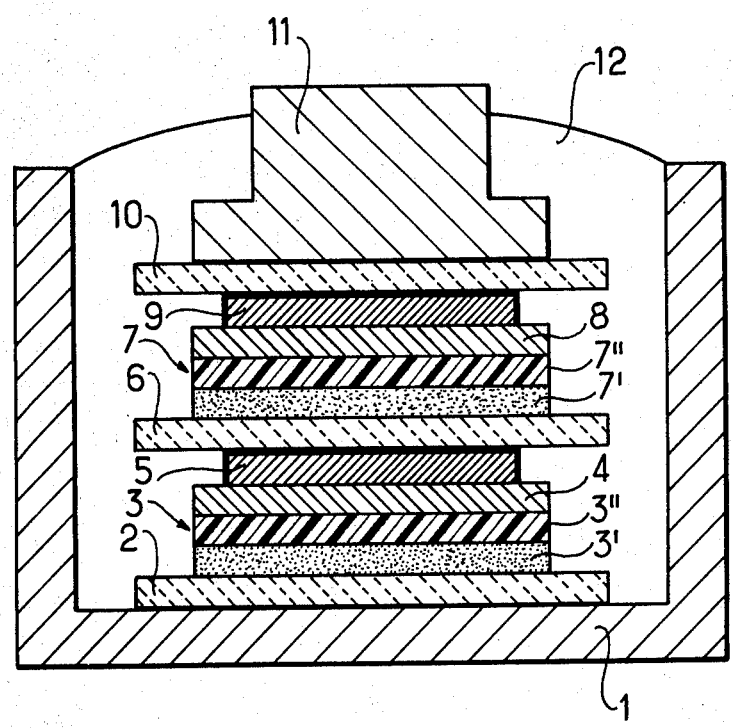

METHOD FOR PREPARING ELECTROCHEMICAL ELEMENTS IN THIN LAYERS

The present invention concerns electrochemical elements in thin layers as well as a method for preparing the said elements. It also concerns storage batteries consisting of one or several of the said elements.

Elements constituted mainly by a stack of thin solid layers arranged, in the charged state, according to the following sequence are known;

A cathode collector formed by a substance which is a good electronic conductor;

A catholyte comprising a substance such as cupric sulphide suitable for providing anions capable of forming, with the substance of the anode, a discharge product;

A separator impermeable to the catholyte and comprising an ionic conductor salt;

A lithium anode.

The aim of the present invention is to form elements having a high power to weight ratio and efficiency on discharging, capable, moreover, of constituting batteries for which numerous practical applications may be found.

The invention therefore has for its object an electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator impermeable to the said catholyte and a fourth thin anode layer comprising lithium, characterized in that the said catholyte as well as the said separator comprise at least partly a gel formed by at least a polyvinylic acetal impregnated with at least a solvent and at least an ionically conductive salt.

The invention concerns also an electrochemical element of the type comprising successively, a first thin layer constituting an electronically conductive cathode collector, a second thin layer forming a catholyte comprising a substance suitable for providing anions capable of forming, with the substance of an anode, a discharge product, a third thin layer forming a separator which is impermeable to the said catholyte and a fourth thin anode layer comprising lithium, characterized in that the said catholyte, as well as the said separator comprise at least partly a gel impregnated with at least a solvent as well as with at least an ionically conductive salt, the gel forming the said catholyte comprising at least a polyvinylic acetal the gel forming the said separator comprising at least a polymer as well as a mineral charge.

It concerns also a method for producing an electrochemical element as well as storage batteries comprising one or several of the said elements in series.

The following text will describe a few examples of embodiment of electrochemical elements in thin layers, according to the invention, these examples being given only by way of illustration and having no limiting character, with reference to the accompanying FIGURE.

In all cases, the cathode collector is formed by a thin metallic layer such as copper and the anode is formed by a thin layer of lithium.

Inasmuch as concerns the catholyte, the latter is formed by a cupric sulphide powder CuS agglomerated by a gel consisting of a resin such as polyvinylic formal (designated hereinafter by the letters PVF) and of a solvent such as propylene carbonate (designated hereinafter by the letters PC) saturated with a conductive salt such as ammonium perchlorate $ClO_4Am$.

Such a gel is prepared by mixing the various ingredients mentioned above in the following proportions by weight:

$$\frac{5}{100} < \frac{PVF}{PC} < \frac{15}{100}, \frac{50}{50} < \frac{CuS}{PVF+PC+ClO_4Am} < \frac{90}{10}$$

Preferably, these values are 10/100 and 70/30 respectively.

Such a gel, which has a weak consistency, is pasted onto a substrate consisting of a silver or tin-plated or silver-plated silver or copper foil on which a grid forming a honeycomb support is welded by thermocompression. The said gel is therefore pasted on so as to pack the alveoli of the grid, then the excess gel overflowing from the said grid is scraped off.

It must be understood that the thickness of the grid and the dimensions of the alveoli are predetermined as a function of the required capacity of the element.

It is also possible to produce the catholyte as set forth above, but replacing the PVF by polyvinylic butyral (designated hereinafter by PVB) and replacing the PC by N-methyl-pyrrolidone (referenced N.M.P.)

Such a gel could possibly be non-reticulated or reticulated in the manner which will be described in the case of the separator.

A few examples of embodiments of separators will now be described, the catholyte having a composition substantially identical to those previously described.

It should be mentioned that the separator is formed by a polyvinylic acetal, more particularly PVF or PVB and a solvent saturated with a conductive salt such as $ClO_4Am$.

Jointly with the PVF, the solvent generally used is PC.

Jointly with the PVB, the solvent generally used is N.M.P.

A gel which, according to the relative proportions of acetal and of solvent, has variable viscosities, is thus obtained.

Such a gel could be either reticulated or non-reticulated and, in this latter case, the reticulation agent could be either directly incorporated with the ingredients forming the gel or incorporated with the gel after the forming thereof using the said ingredients.

1st example PVF and PC are mixed in proportions by weight such that:

$5/100 < PVF/PC < 15/100$ and preferably equal to 10/100 the PC being saturated with $ClO_4Am$.

A soft gel which is not very resistant, is run after a slight heating on to a porous support such as asbestos so as to impregnate it.

The separator thus produced has excellent electrical conductivity and promotes good discharging of the element. Applications which are a particularly advantage are found for it in single-cell batteries. It should be observed that it is possible to use, instead of $ClO_4Am$ (as, moreover, in the following examples) other salts, such as lithium perchlorate, potassium iodide or sodium fluoroborate. Such a detail applies also to the case of the catholyte.

2nd example

PVF and PC are mixed in proportions by weight such that:

20/100<PVF/PC<40/100 and preferably equal to 30/100

The PC being saturated with $ClO_4Am$.

A gel having the consistency of indiarubber which is put into form either by hot casting on a support plate so as to form a thin film, or by casting or pressing on an insulating woven fabric such as nylon.

The separator thus obtained has a high melting point, in the order of 70° to 120° according to its composition.

A variant consists of substituting about 50% of the PVF by bentone.

This product is an organophilic bentonite whose alkaline cations have been substituted by quaternary ammonium.

A hard gel having excellent conductivity and offering opposition to the passivation of the element during discharge is obtained.

The two examples which have just been described concern separators formed by non-reticulated hard or soft gels.

Examples in which reticulated gels are used will now be described.

It should immediately be stated that such gels have excellent mechanical properties, as well as very good thermal resistance; they are to great advantage, used in batteries formed by several elements, in which the temperature may reach 70° C.

3rd example

PVB comprising about 25% of non-acetalised residual OH is mixed with a solvent such as ethanol or tetrahydrofurane (designated by THF) and with a reticulation agent, in this case, epichlorhydrine or chloroepoxypropane (designated by the initials EPC, hereinafter) so as to form a fluid solution, the proportion of EPC being about 5 to 10% of the weight of the PVB.

To great advantage, a few drops of $H_2SO_4$, which catalyses the reaction, is added to the mixture.

It is run onto a plate and dried to remove the THF. The film obtained having a spongy consistency is soaked with NMP saturated with $ClO_4Am$. It is dried superficially to remove the excess NMP. Such a film has a resistance of 65 ohm/squ. cm. and an excellent mechanical reaction.

It is also possible, instead of running onto a plate, to impregnate a porous asbestos support.

4th example

PVF comprising about 5 to 6% of residual OH is mixed with THF as a solvent and with EPC as a reticulating agent, in $H_2SO_4$ in a proportion by weight substantially the same as previously.

It is run onto a plate, dried to remove the THF and the film obtained is impregnated with PC saturated with $ClO_4Am$. Drying is effected at ambient temperature, but that operation may be carried out at about 70° C during a few minutes in order to strengthen the reticulation.

Such a film has a resistance of about 100 ohms/squ.cm.

As in the preceding case, an asbestos support may be impregnated with that gel.

5th example

PVF and PC as a solvent saturated with $ClO_4Am$ and EPC as a reticulation agent are mixed together in the following proportions by weight;

10/100<10/100 PVC/PC<20/100

EPC: 5 to 10% of the weight of PVF.

The soft gel thus formed is rapidly injected or hot pressed on a woven nylon fabric. After cooling, a heat treatment is carried out at a temperature of 50° to 70° and during a period lasting from a few minutes to an hour to complete the reticulation and desolvatation required.

It might possibly be necessary to re-impregnate with PC saturated with $ClO_4Am$ if too great a quantity of solvent has been removed.

6th example

PVB comprising about 25% of residual OH is mixed with a solvent such as ethanol or THF so as to obtain a fluid mixture. It is run onto a plate so as to form a film which is dried.

In that case, reticulation is effected in several different ways:

Either by dipping of the said film in a solution of EPC in NMP saturated with $ClO_4Am$;

Or by dipping the said film in a solution of isopropyl titanate in NMP saturated with $ClO_4Am$;

Or by dipping the said film in a solution of dimethylolurea in NMP saturated with $ClO_4Am$.

The film therefore contains NMP saturated with $ClO_4Am$.

7th example

PVF and THF are mixed together in proportions such that a fluid product is obtained.

This is run onto a plate so as to form a film which is dried to remove the THF and which is reticulated:

Either by dipping the said film in a solution of EPC in PC saturated with $ClO_4Am$;

Or by dipping the said film in a solution of isopropyl titanate in NMP saturated with $ClO_4Am$.

A variant of the two preceding examples consists in forming a gel with PVF and PC (or PVB and NMP), in hot casting it on a plate and in reticulating it "in situ" by running onto the film thus formed a reticulation solution similar to those previously mentioned. Such a variant makes it possible to avoid the film drying phase and the consecutive re-impregnation and hence to operate more rapidly.

8th example

PVC and PC saturated with $ClO_4Am$ are mixed together in a proportion PVC/PC close to 20/100 to 30/100.

A relatively hard gel which is hot pressed or hot injected so as to form a film which may also be formed on a woven nylon fabric, is obtained.

The film is dried then dipped in a reticulation bath as previously mentioned.

9th example

A fluorinated macro-molecular compound such as the copolymer of vinylidene fluoride is of hexafluoropropylene, a reticulation agent such as N-N'-Dicinnamylidene-1.6-hexanediamine and magnesia are inserted in a solvent such as a not very volatile ketone, in this case, methyl-ethylketone. The mixture is very thoroughly shaken to make it homogenous. In this way, a viscous gel which is run onto a glass plate so as to form a film or thin layer having, after drying, a thickness between 1 and 2/10 of a mmn, is obtained.

Drying is effected at ambient temperature in order to remove the solvent, then the film is heated in an oven the about 160° for 15 to 30 minutes to effect the reticulation of the polymer and remove all traces of solvent.

The thin film or layer is then impregnated with a saturated solution of ammonium perchlorate in PC by dipping during 4 to 5 hours. Lastly, the film thus impregnated is dried then installed in the electrochemical element.

Inasmuch as concerns the relative proportions of the various ingredients and of solvent, these proportions are such that a solution having a viscosity suitable for the running off is obtained.

By way of an example, the following proportions may be used:

| | |
|---|---|
| Copolymer of vinylidene fluoride and hexalfuoropropylene | 100 parts by weight |
| Reticulation agent | 2 to 3 parts by weight |
| Magnesia | 15 parts by weight |

The assembly is inserted in 600 parts by weight of methylethylketone.

A variant of embodiment consists in using pure polyvinylidene fluoride.

Another variant consists in using as a reticulation agent an organic peroxyde and more particularly cinnamyle peroxyde.

In all cases, the proportions used are substantially the same as those shown in the preceding text.

Having thus described a few examples of embodiment of the catholyte and of the separator of an electromechanical element according to the invention the embodiment of a battery or cell comprising two elements connected up in series will now be illustrated with reference to the accompanying FIGURE, it being understood that it is possible to form assemblies comprising a greater number of elements.

Thus, the accompanying FIGURE shows a box 1 made, for example of stainless steel in which are successively stacked the following thin layers:

A copper sheet 2;
A catholyte 3 formed by its substrate 3' and by its grid 3'' impregnated with the gel containing Cus;
A separator 4;
A sheet of lithium 5;
A sheet of copper 6;
A catholyte 7 formed by its substrate 7' and by its grid 7'';
A separator 8;
A sheet of lithium 9;
A sheet of copper 10.

A chock 11, intended for constituting one pole of the battery, the other pole being the box 1, is arranged on the copper sheet 10.

It will be observed more particularly that the copper sheets 2, 6 and 10 have a diameter substantially greater than that of the other components with the aim of avoiding any possible arcing due to flow deformation of the separators and consequently the self-discharging of the circuit formed by the lithium and the cupric sulphide.

It will be observed also that the sheets of lithium 5 and 9 have a diameter less than that of the other components.

In the first case, a slight pressure is applied to the chock 11 so that the height of the stack of the various layers be brought to a dimension equal to the sum of the thickness of the components.

The assembly is then brought to a temperature of 60°. Paraffin having a relatively low melting point, in the order of 55° is then poured into the box 1 and the assembly is transferred into a vacuum oven at about 60° to effect the degassing. After such a degassing, the assembly is removed from the oven, this having the effect of making the liquid paraffin enter all the interstices and of thus producing an effective coating shown at 12 in the FIGURE. It must be understood that a lid crimped or fitted to the upper part of the box 1 could be used instead of the chock 11.

To give a clear idea, the box 1 has a diameter of 20mm, the copper sheets 2, 6 and 10 have a thickness of 5/100 mm, the catholyte 3 and 7 have a diameter of 18mm, the thickness of the substrates being 2/100mm and the thickness of the grid being a few tenths of a mm (a thickness of 1/10 of a mm corresponding to a capacity of 3 to 4 mAH/squ. cm) the separators 4 and 8 having a thickness comprised between 0.1 and 0.4 mm and the sheets of lithium 5 and 9 having a thickness of 0.2 mm for a diameter of 16 mm.

By way of an indication, the performances for storage batteries of 5 cells in series are substantially as follows;

Electromotive force; 10 volts.

Efficiency at 70 to 80% of the theoretical output for a discharge of 5 $\mu$ A/Squ. cm.

It must be understood that the invention is in no way limited to the embodiments described and illustrated, but on the contrary, it covers all the variants thereof.

What is claimed is:

1. A method for producing an electrochemical element comprising successively, a first thin layer constituting an electronically conductive cathode collector, a second thin layer forming a catholyte comprising a substance suitable for providing anions capable of forming a discharge product with the substance of an anode, a third thin layer forming a separator impermeable to the said catholyte and a fourth thin anode layer comprising lithium, said method comprising the steps of:

A. forming a catholyte comprising a polyvinylic acetal impregnated with a solvent, a material suitable for providing anions capable of forming a discharge product with an anode and, an anionically conductive salt, such that the ratio of the weight of the acetal to the solvent saturated with ionically conductive salt is between about 0.05 and 0.15 and the ratio of the weight of the material suitable for providing anions to the total weight of the acetal, solvent and conductive salt is between about 1 and 9, B. applying the catholyte obtained in (A) to the pores of a conductive grid connected to a conductive substrate such that the thickness of the gel is substantially equal to the thickness of the grid, C. placing the element obtained in (B) between said cathode layer and said anode layer such that the catholyte is separated from the anode layer by said separator.

2. The method of claim 1, including a method for manufacturing the separator comprising the steps of:

D. mixing a polyvinylic acetal with a reticulating agent in a reticulation solvent in the presence of traces of sulphuric acid, E. forming a thin layer of the gel obtained in (D), F. drying said thin layer, G. impregnating said dry layer with a solvent saturated with ionically conductive salt.

3. The method of claim 1 wherein said material suitable for providing anions is cupric sulphide and said ionically conductive salt is ammonium perchlorate.

4. The method of claim 2 wherein said reticulating agent is epichlorhydrine.

5. The method of claim 1 wherein said polyvinylic acetal is polyvinylic formal or polyvinylic butyral.

6. The method of claim 2 wherein said polyvinylic acetal is polyvinylic formal or polyvinylic butyral.

7. The method of claim 1 including a method for manufacturing the separator comprising the steps of:

D. mixing in methyl ethylketone about 80 to 100 parts by weight of a polymer, 1 to 4 parts by weight of a reticulating agent, 10 to 20 parts by weight of a mineral charge, E. casting a thin layer of the gel obtained in (D), F. drying said thin layer substantially at ambient temperature, G. heating said thin layer at 160° C. for about 15 to 30 minutes H. immersing said thin layer in propylene carbonate saturated with ammonium perchlorate.

8. The method of claim 7 wherein said mineral charge is magnesium.

9. The method of claim 7 wherein said polymer is vinylidene polyfluoride or a copolymer of vinylidene polyfluoride and hexafluoropropylene.

10. The method of claim 2 wherein said thin layer of step (E) is formed by running the gel onto a plate.

11. The method of claim 2 wherein said thin layer of step (E) is formed by running the gel onto a porous support.

12. The method of claim 11 wherein said porous support is asbestos.

13. The method of claim 2 wherein said thin layer in step (E) is formed by hot injection of the gel onto woven insulating fabric.

14. The method of claim 13 wherein said insulating fabric is comprised of nylon.

15. A method of manufacturing a storage battery comprising the steps of:

A. stacking successively within a container a plurality of elements, each element comprising a first thin layer constituting an electronically conductive cathode collectors, a second thin layer forming a catholyte comprising a substance suitable for providing anions capable for forming a discharge product with the substance of an anode, a third thin layer forming a separator impermeable to the catholyte and a fourth thin anode layer comprising lithium, B. positioning a thin layer of electrically conductive material on the stack formed in (A), C. disposing on said thin layer positioned in (B) a pole member, D. applying to said pole member sufficient pressure to bring the height of said stack formed in (B) to a height equal to the sum of the thicknesses of the thin layers, E. heating the assembly of step (D) to a temperature of about 50 to 100° C., F. admitting to said container a coating material having a melting point no greater than the temperature in (E), G. degasing the assembly in a vacuum at a temperature substantially equal to the temperature in (E), H. cooling and depressurizing said assembly to ambient temperature and atmospheric pressure.

* * * * *